United States Patent [19]

Lamont

[11] 4,080,308

[45] Mar. 21, 1978

[54] TREATMENT OF LIGNITE TO YIELD A PUMPABLE FLUID

[75] Inventor: William E. Lamont, Tuscaloosa, Ala.

[73] Assignee: The United States of America as represented by the Secretary of the Interior, Washington, D.C.

[21] Appl. No.: 798,514

[22] Filed: May 19, 1977

[51] Int. Cl.$^2$ ............................................. B01F 3/00
[52] U.S. Cl. ............................. 252/363.5; 252/311; 302/66
[58] Field of Search ............... 252/363.5, 311; 302/66

[56] References Cited

U.S. PATENT DOCUMENTS 2,427,642  9/1947  Aitchison .................. 252/363.5 X Primary Examiner—Stephen J. Lechert, Jr.
Attorney, Agent, or Firm—William S. Brown; Donald A. Gardiner

[57] ABSTRACT

Lignites, which have high inherent water contents of 30–60% by weight, are treated with a small amount of a dispersing and/or viscosity reducing agent such as tetrasodium pyrophosphate to form a pumpable fluid which is easily transportable.

4 Claims, No Drawings

TREATMENT OF LIGNITE TO YIELD A PUMPABLE FLUID

BACKGROUND OF THE INVENTION

This invention relates to a method for the treatment of lignites which have high inherent water contents in order to form the lignites into readily pumpable fluids.

DESCRIPTION OF THE PRIOR ART

In the United States, lignite deposits constitute perhaps one-third of the total resources of solid fuels. Lignites comprise a low rank of coal between peat and subbituminous coal. The distinction of lignite from these materials is not sharp as the transition from one to the other is gradual. Brown coal is a form of lignite and is closely related to peat. Lignites contain high moisture as mined and have heating valves in the range of 5500-8300 Btu/lb. They tend to disintegrate when exposed to weather and may ignite spontaneously. The principal U.S. deposits are in North Dakota, South Dakota, Montana, Texas, Louisiana, Mississippi and Arkansas.

Many of the lignite deposits are contained in relatively thin beds of about 2 to 6 feet thick. However, these beds still represent significant tonnages of a potentially useful resource particularly during recent periods of energy scarcity. It has been estimated that about 10,000 tons per acre of lignite exists in a 6-foot seam. Most of these lignite deposits contain up to 60% moisture in place or in situ with the average moisture content about 50%.

Since the transportation costs for moving this material represent a very significant portion of the overall mining costs, particularly on a dry basis, the high concentration of moisture within the lignite means that the fuel being transported contains only about 50% of actual fuel. Therefore, it is necessary that means be found to overcome the problem of moisture contained in the lignite. The present invention provides a solution to this problem.

There are methods known in the art by which bituminous fuels have been treated with various materials in order to change their physical or chemical form. For example, U.S. Pat. No. 1,925,551 discloses a method for recovering hydrocarbons and oils from their mixtures with coal by introducing an aqueous solution containing a wetting agent to impart an alkaline reaction with the hydrocarbon liquid to assist in the extraction of coal. Also U.S. Pat. No. 2,367,665 teaches a method for exploring for subterranean oil deposits by using a dispersing agent to convert a soil sample containing the oil into a slurry. Further, U.S. Pat. No. 3,850,477 discloses a method for treating unmined coals by injecting a wetting agent to reduce interlayer forces at the natural interfaces of the coal and then injecting an inert gas in order to form a suspension of coal in the gas and recovering the coal.

SUMMARY OF THE INVENTION

It is accordingly one object of the present invention to provide a method for the treatment of lignite to convert the lignite to a different physical form.

A still further object of the invention is to provide a method for the treatment of raw mined lignites to form a liquid product which may be transported at substantially reduced costs as compared with the solid lignite.

A still further object of the present invention is to provide a method for the treatment of raw mined lignite to change its physical form and thereby result in a pumpable product.

It is still a further object of the present invention to provide a method for the treatment of raw mined solid lignite by treating the solid lignite with a dispersing agent to adjust the viscosity of the lignite and form a pumpable fluid which can be transported and stored at substantially reduced costs.

Other objects and advantages of the present invention will be apparent as the description thereof proceeds.

In satisfaction of the foregoing objects and advantages there is provided by this invention a method for transforming raw mined lignite into a pumpable fluid which may be easily transported and stored without the danger of spontaneous combustion, which comprises mixing the solid lignite with a small amount of a dispersing agent, said dispersing agent being added in sufficient amount to adjust the viscosity of the lignite but insufficient to significantly change the solids content.

DESCRIPTION OF PREFERRED EMBODIMENTS

As indicated above, most raw mined lignites have high inherent water contents in the range of about 30-60 weight percent. The bulk of this high moisture content is present as free water, that is, it is not present as the mineral hydrate, but rather is merely bound in the crystalline structure of the lignite. Inasmuch as the water was not primarily contained as water of hydration, it was found that this water could be converted so as to yield a pumpable fluid. According to the present invention it was therefore discovered that by the addition of small quantities of dispersing or viscosity reducing chemical agents, along with a limited amount of work or energy required to thoroughly mix the dispersing and/or viscosity reducing reagent with the lignite, that the amount of water present in the lignite was in fact sufficient to fluidize the lignite and yield a pumpable fluid without significantly changing the percent solids of the slurry.

In conducting the process of the present invention, it was found that the lignite could be treated in a raw mined form and that the treatment would in fact result in a pumpable fluid which is easier to handle and ship than the solid lignite product and thereby reduces transportation costs. Moreover, pumping and tank storage allows in-line blending to yield a more consistent product.

It was discovered that mixing of the dispersing agent or viscosity adjusting agent with the lignite raw product was effective in utilizing the inherent water content of the solid lignite so as to yield the pumpable fluid by changing the viscosity while the solids content is changed by an insignificant amount. As a result, the mixture changes its physical form to become a fluid because of the high inherent nonbound water content. Thus, the mass is reduced from the physical form of a solid coal to a more homogeneous mass in fluid form and, therefore, becomes more suitable for transportation and storage and conversion to other useful products.

In conducting the process of the present invention, it was found that tetrasodium pyrophosphate (TSPP) was the preferred dispersing agent although other known dispersing agents may also be used. The dispersing agent as used herein is any reagent which is sufficient to reduce the viscosity of the lignite sufficiently to convert the lignite to a pumpable fluid without significantly reducing the solids content. The dispersing agent is preferably used as a 2-20 wt. % aqueous solution.

In converting the solid lignite to the fluid form, the raw lignite as mined is mixed with about 2-4 pounds of dispersing agent per ton of lignite, as it has been found that this amount of dispersing agent is suitable to adjust the viscosity of the lignite and form the pumpable fluid. The treatment comprises thoroughly mixing the dispersing agent and/or viscosity reducing agent with the lignite by any conventional mixing means. Once the thorough mixing is completed, there results a high viscosity black thixotropic fluid which has the appearance of an asphaltic oil. This product remains sufficiently fluid for pumping for a substantial period of time.

The following example is presented to illustrate a specific embodiment of the invention. However, the invention is not to be considered as limited thereto as obvious variations will become apparent to those skilled in the art. In the example and throughout this specification, parts are by weight unless otherwise stated.

EXAMPLE

In this example a raw mined lignite was used which had a 60% by weight water content by analysis. The dispersing agent used was tetrasodium pyrophosphate as a 5% by weight aqueous solution. In conducting the process the raw mined lignite was mixed at a rate of three pounds of the tetrasodium pyrophosphate per ton of lignite and subjected to thorough mixing at ambient temperature. After mixing for a sufficient period it was noted that the mixture gradually became fluid and on completion of the mixing there was recovered a black thixotropic fluid which had the appearance of an asphaltic oil.

The invention has been described herein with reference to certain preferred embodiments; however, as obvious variations thereon will become apparent to those skilled in the art, the invention is not to be considered as limited thereto.

What is claimed is:

1. A method for transforming raw mined lignite into a pumpable fluid which comprises adding to the lignite a dispersing agent consisting of tetrasodium pyrophosphate in an amount sufficient to adjust the viscosity of said lignite without significantly changing the solids content, and subjecting said lignite and said dispersing agent to thorough mixing for a sufficient period to convert the lignite to a pumpable fluid.

2. A method according to claim 1 wherein the raw mined lignite has an unbound water content of about 30-60% by weight.

3. A method according to claim 1 wherein the dispersing agent is mixed with the lignite at the rate of about 2 to about 4 pounds per ton of lignite.

4. A method according to claim 3 wherein the dispersing agent is used as an aqueous solution containing about 2-20 wt. % of the dispersing agent.

* * * * *